US010472845B2

(12) United States Patent
Stevens et al.

(10) Patent No.: US 10,472,845 B2
(45) Date of Patent: Nov. 12, 2019

(54) FASTENER

(71) Applicant: Infinigy Solutions, LLC, Albany, NY (US)

(72) Inventors: John S. Stevens, Rexford, NY (US); Andrew J. DeSantis, III, Malta, NY (US); Joseph R. Johnston, Malta, NY (US); Merritt P Bell, Wells, VT (US)

(73) Assignee: Infinigy Solutions, LLC, Albany, NY (US)

( * ) Notice: Subject to any disclaimer, the term of this patent is extended or adjusted under 35 U.S.C. 154(b) by 666 days.

(21) Appl. No.: 14/974,181

(22) Filed: Dec. 18, 2015

(65) Prior Publication Data

US 2017/0058550 A1 Mar. 2, 2017

Related U.S. Application Data

(63) Continuation of application No. 14/836,829, filed on Aug. 26, 2015, now Pat. No. 9,822,544.

(51) Int. Cl.

| | |
|---|---|
| ***F16B 21/00*** | (2006.01) |
| ***E04H 12/20*** | (2006.01) |
| ***H01Q 1/12*** | (2006.01) |
| ***E04H 12/22*** | (2006.01) |
| ***E04H 12/34*** | (2006.01) |

(52) U.S. Cl.

CPC ......... *E04H 12/20* (2013.01); *E04H 12/2292* (2013.01); *E04H 12/347* (2013.01); *H01Q 1/12* (2013.01)

(58) Field of Classification Search

CPC .............................. F16B 19/10; H01Q 1/1214

USPC ........ 411/340, 341, 344, 21; 403/322.1, 325

See application file for complete search history.

(56) References Cited

U.S. PATENT DOCUMENTS

| | | | | | |
|---|---|---|---|---|---|
| 575,032 | A * | 1/1897 | Kimbrell | | |
| 838,833 | A * | 4/1908 | Bossi | | |
| 1,719,891 | A * | 7/1929 | Kuhl | F16B 21/125 | 278/96 |
| 2,408,560 | A * | 10/1946 | Keehn | B25B 31/005 | 269/232 |
| 3,497,240 | A * | 2/1970 | Doerfer | B60D 1/065 | 280/406.2 |
| 3,534,650 | A * | 10/1970 | Kubokawa | F16B 19/109 | 24/453 |
| 4,500,239 | A * | 2/1985 | Liebig | F16B 13/0833 | 411/341 |
| 4,764,065 | A * | 8/1988 | Johnson | F16B 13/08 | 24/625 |

(Continued)

*Primary Examiner* — Gary W Estremsky

(74) *Attorney, Agent, or Firm* — Lee Palmateer Law Office LLC; Lee Palmateer

(57) ABSTRACT

A fastener for fastening parts together. The fastener has a shaft, a head and movable members that spring outwardly from the shaft to firmly capture the parts between the members and the head upon insertion of the fastener into aligned holes in the parts. No threading step is necessary. The movable members may be retractable into the shaft to facilitate insertion into holes corresponding in size to the shaft. The members may have a contact surface sloping away from the head and forming a tapered space between the members and the head so that the outward spring bias tends to reduce the space and maintain tightness of the joint. The fastener may be operatively deployed by a single insertion step.

28 Claims, 9 Drawing Sheets

(56) References Cited

U.S. PATENT DOCUMENTS

| | | | | | |
|---|---|---|---|---|---|
| 4,988,246 | A * | 1/1991 | Yoshida | F16B 31/028 | 116/DIG. 34 |
| 5,048,393 | A * | 9/1991 | Grabner | F41A 9/38 | 24/453 |
| 5,199,733 | A * | 4/1993 | DeLorme | B60D 1/02 | 24/453 |
| 5,791,850 | A * | 8/1998 | Mundt | F16B 19/1036 | 411/21 |
| 6,193,261 | B1 * | 2/2001 | Hahka | B60D 1/02 | 24/453 |
| 6,193,361 | B1 * | 2/2001 | Wen | B41J 2/01 | 347/84 |
| 6,752,562 | B2 * | 6/2004 | Mills | F16B 19/109 | 24/453 |
| 8,747,013 | B2 * | 6/2014 | Parsell, Jr. | B64C 27/006 | 244/17.11 |
| 2015/0219141 | A1 * | 8/2015 | English | F16B 35/005 | 29/525.02 |

* cited by examiner

FASTENER

CROSS-REFERENCE TO RELATED APPLICATIONS

This application is a continuation of and claims the benefit of prior pending U.S. Nonprovisional patent application Ser. No. 14/836,829 filed on Aug. 26, 2015, which is hereby incorporated herein by reference in its entirety.

TECHNICAL FIELD

The present invention relates fasteners for fastening things together, a preferred embodiment of which is used to fasten parts to monopole towers to reinforce monopole towers.

BACKGROUND OF THE INVENTION

Monopole towers are used to support antenna arrays for wireless telecommunication systems. Monopole towers typically comprise a monopole, which is a hollow tubular structures, made of metal, with polygonal or circular cross section, relatively wider at the base, and tapering with elevation. Such towers typically further comprise structural enhancement attached to the bottom of the monopole, such as base plates. The towers are designed to support specified design loads. However, need may arise after the initial tower installation to exceed specified design loads. Thus it may become necessary to reinforce an existing tower to increase its load carrying capacity, such as to increase capacity to carry combined axial, moment and shear loading.

Antennae impart vertical compressive loads and significant bending moments on the tower. Wind imparts cyclic lateral loads and bending moments, which induces sway causing additional secondary bending moments. Reinforcement means must accommodate these loads.

One existing way to reinforce monopoles is to attach reinforcing rods to the sides of the tower. In such systems, the rods may be embedded in the foundation and tightly attached to the tower using mounting brackets at multiple elevations. An example of a mounting bracket comprises an angle iron bolted to the side of the tower with U-bolts that fasten the rods to the angle iron. Rods spaced a distance outboard of the tower increase the effective cross sectional moment of inertia and bending load capacity relative to the unreinforced tower. To transmit rod loads directly to the ground, some systems embed the rods directly in the tower foundation.

When the entire system is experiencing bending loads, such as under lateral wind loads, individual reinforcing rods on one side of the tower may be in tension while rods on the opposite side may be in compression. Loads in a reinforcing rod may alternate cyclically from tension to compression when the tower experiences back and forth sway in wind.

Existing systems rely on fixed attachment of the reinforcing bar rods at intermediate brackets that are spaced apart at vertical intervals. Fixed intermediate attachment affects the mechanical properties and mechanical behavior of the entire system and individual components thereof, including the pole, the brackets and the rods. The intermediate brackets experience significant loads. In addition, substantial assembly work is involved in making each intermediate connection separately, including mounting each bracket to the pole and mounting each bracket to the reinforcing rod. Typically, existing systems also embed reinforcing rods in the foundation by boring holes in the foundation, inserting rods in the holes, and then filling the remaining space in the holes with adhesive or grout to form the joint between the foundation and rod. This embedding procedure and resulting joint have undesirable qualities, such as undesirable qualities under cyclic loading.

There is a need for a monopole tower reinforcing system with a different type of intermediate support that simplifies assembly, that provides lateral spacing and stability to the reinforcing rods, and that may reduce support loads and provide axial freedom of deflection to the rod. There is also a need for a system that does not rely on embedded reinforcing rods in the foundation and using adhesives or grout to form the joint between the rods and foundation.

The present invention provides a fastener suitable for attaching standoffs and termination brackets to monopole towers in reinforcement systems that fills those and other needs. The fastener has inherent application for fastening parts in general, without need for a threading step to tighten the fastener.

SUMMARY OF THE INVENTION

In a first aspect, the present invention provides a fastener for inserting into a hole of at least one item, said fastener comprising: a body comprising a longitudinally extending first body portion, such as a shaft in a preferred embodiment, for insertion into the hole and a laterally extending second body portion, such as a head in a preferred embodiment, integral to and extending laterally outward from the first body portion for contacting one of the at least one item peripheral to the proximal end of the hole; said first body portion having at least one laterally facing opening; and at least one retractable member movably connected to the body; wherein said retractable member is movable between a retracted position in which at least a portion of the retractable member is disposed in said opening, and an extended position in which at least a portion of the retractable member extends out of the opening a longitudinal distance from said second body portion; said retractable member having a contact surface for contacting one of the at least one item peripheral to the distal end of the hole so as to hold the at least one item between said contact surface and said second body portion.

In a second aspect, the present invention provides a fastener for fastening to at least one item, said fastener comprising: a body comprising a longitudinally extending nonthreaded shaft and a laterally extending body portion extending laterally outward from the shaft; said shaft having at least one laterally facing opening; and at least one retractable member movably connected to the body; wherein said retractable member is movable between a retracted position in which at least a portion of the retractable member is disposed in said opening, and an extended position in which at least a portion of the retractable member extends out of the opening a longitudinal distance from said laterally extending body portion so as to form a space between said member and the said laterally extending body portion for receiving the at least one item.

In a third aspect, the present invention provides a fastener for fastening to at least one item, said fastener comprising: a body comprising a longitudinally extending shaft and a laterally extending body portion integral to and extending laterally outward from the shaft; at least one movable member having a contact surface, said movable member rotatably connected to the body at a first pivot connection a distance from the contact surface; said pivot connection being at a fixed distance from the laterally extending body portion; said movable member rotatable about said pivot connection between a first position and second position, wherein the contact surface is disposed further laterally outward from the shaft in the second position than in the first position; and wherein the contact surface is disposed a longitudinal distance from said laterally extending body portion so as to form a space between said contact surface and the said laterally extending body portion for receiving the at least one item.

In a forth aspect, the present invention provides a method of fastening a fastener to at least one item that has a hole and a thickness, comprising the steps of: possessing a fastener comprising a body and at least one spring biased member movably connected to the body, said body comprising a longitudinally extending first body portion and a laterally extending second body portion; inserting the fastener into the hole of each of said at least one item until said second body portion contacts at least one of the at least one item peripheral to the proximal end of the hole; and allowing the spring biased member to deflect to a position in which at least a portion thereof extends laterally beyond the periphery of the hole and holds the at least one item tightly between said spring biased member and the second body portion.

In a fifth aspect, the present invention provides a method of fastening a part having a first hole to a monopole tower having a second hole, comprising the steps of: possessing a fastener comprising a body and at least one spring biased member movably connected to the body, said body comprising a longitudinally extending first body portion and a laterally extending second body portion; inserting the fastener into the first and second holes so that said second body portion contacts the part; and allowing the spring biased member to deflect to a position in which at least a portion thereof extends laterally beyond the periphery of the second hole and holds the monopole tower and part between said spring biased member and the second body portion.

BRIEF DESCRIPTION OF THE DRAWINGS

The subject matter that is regarded as the invention is particularly pointed out and distinctly claimed in the concluding portion of the specification. The invention, however, may be best understood by reference to the following detailed description of various embodiments and the accompanying drawings in which:

DETAILED DESCRIPTION OF THE INVENTION

Figure 1:
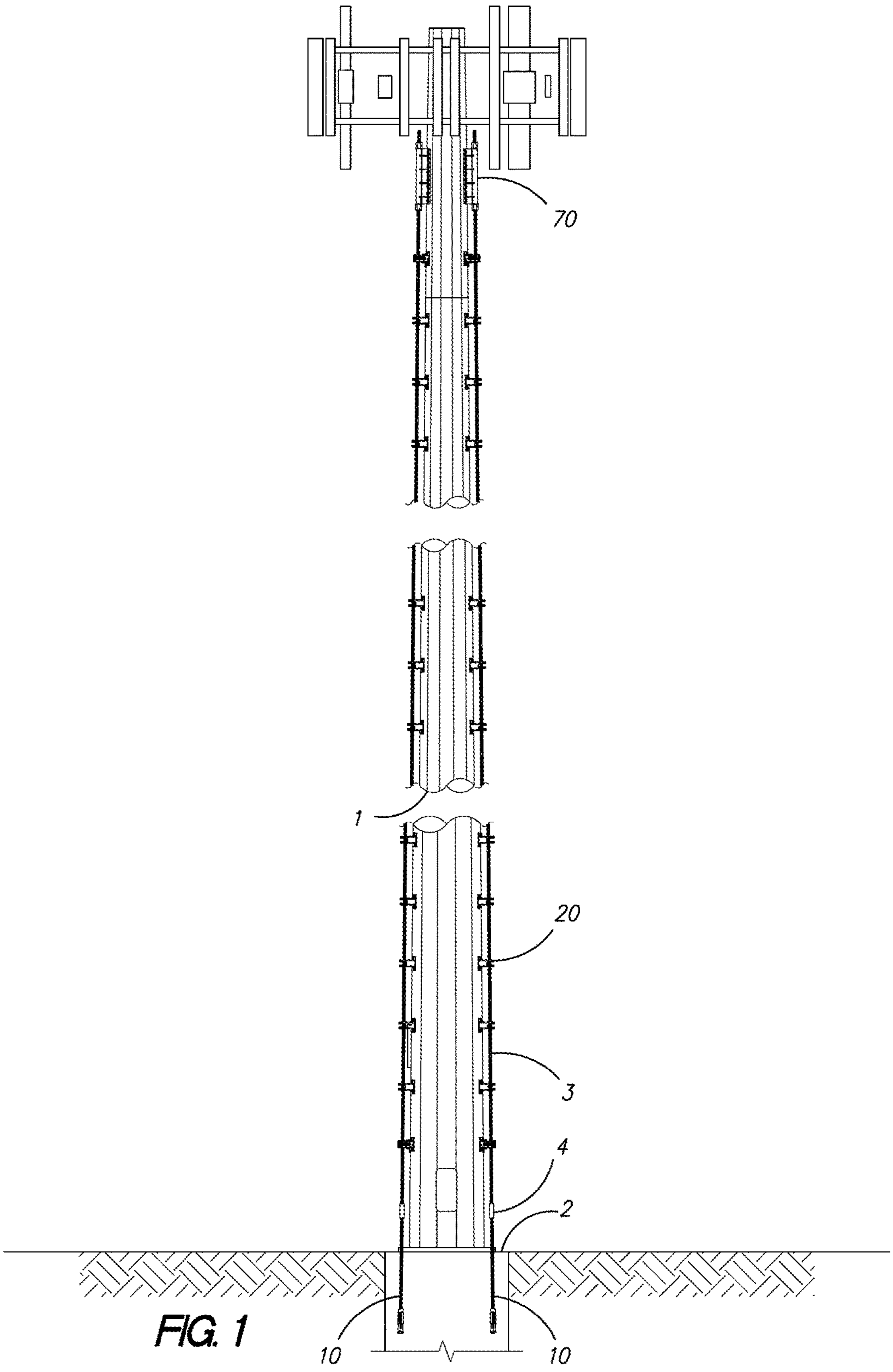
FIG. 1 is an elevation view of a tower reinforcement system in accordance with the present invention.

With reference to FIG. 1, a typical monopole tower 1 is shown in assembly with one embodiment of a reinforcement system of the present invention. Anchor 10 is anchored to foundation 2. The anchor extends above the foundation and is coupled to elongated reinforcing member 3 with a coupling 4. Reinforcing member 3 is connected to tower 1 at least one elevation above the anchor. The uppermost connection comprises a termination bracket 70. Reinforcing member 3 may be connected to tower 1 with one or more standoffs 20 at one or a plurality of intermediate elevations above anchor 10 and below termination bracket 70.

The reinforcement system may comprise multiple reinforcing members spaced around the tower. They may be equally spaced, such as three members spaced 120° apart from each other around the tower as in FIG. 2C.

Connection of an upwardly extending elongated reinforcing member to the ground outboard of the monopole may comprise a connection that goes to or through the structural enhancements at the base of the monopole, such as to or through a base plate, and may comprise a connection that is an outboard distance away from such base structural enhancements. References to outboard of the monopole comprise outboard of the hollow tubular walls of the monopole.

The term “standoff” herein is a device for providing lateral spacing between a monopole tower and an elongated reinforcing member and providing lateral stabilization of the said reinforcing member. Preferred embodiments of the present invention may comprise “boltless” standoffs, meaning that the structural elements of the standoff forming the connection with the reinforcing member, whether a loose or tight connection, do not comprise threaded members. Preferred embodiments of the present invention may comprise “insertion” standoffs, meaning that the method of connection between the standoff and reinforcing member comprises sideways insertion of the member into an opening in the standoff.

In the description of the standoff bodies 21 and 41 herein, “distal” and “proximal” generally relate to proximity to the monopole when operatively assemble with the monopole. In the description of lock pin 52 and push pin 100, “distal” and “proximal” relate to proximity to the head of those parts.

In the embodiment of FIG. 1, reinforcing member 3 may be a reinforcing rod and may have threaded ends for coupling with other threaded parts, such as threaded couplings or nuts. Couplings 4 may be threaded couplings. Reinforcing rods may be threaded over their entire length. Reinforcing members may also comprise segments that are coupled together endwise. Reinforcing members may comprise multiple segments coupled together endwise with multiple vertically spaced apart couplings.

Figure 9A:
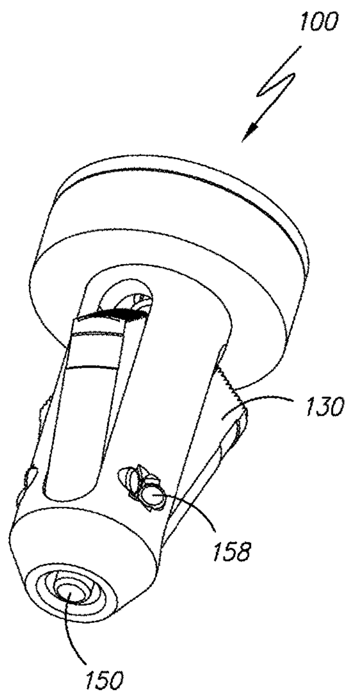
FIG. 9A is a perspective view of a push pin of the present invention.
Figure 9B:
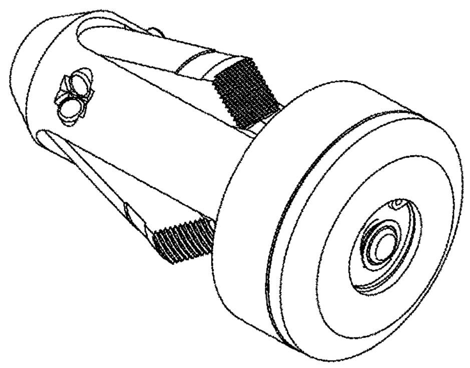
FIG. 9B is another perspective view of the push pin of FIG. 9A.
Figure 9C:
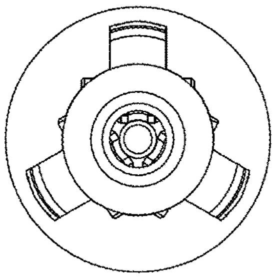
FIG. 9C is an end view of the push pin of FIG. 9A.
Figure 9D:
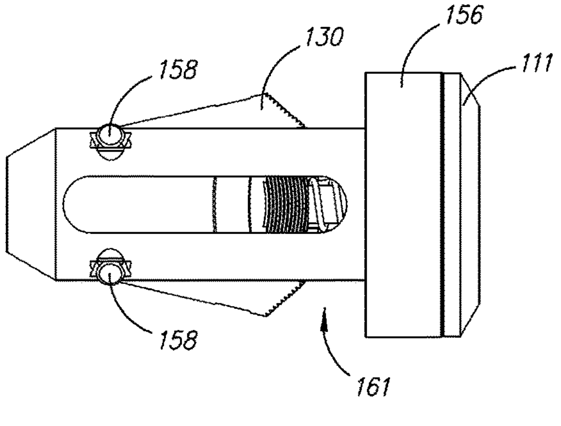
FIG. 9D is a side view of the push pin of FIG. 9A.

Termination bracket may be attached to the monopole using fasteners, which may be anchor bolts or any other suitable fastener. In a preferred embodiment, the fasteners are push pins 100 (FIG. 9A). Reinforcing rod 3 may be tightly attached to termination bracket 70 using top and bottom nuts 5 that are threaded on the rod and tightened against the top and bottom ends of cylinder 61 so as to prevent relative displacement between the rod and bracket. In the preferred embodiment of FIG. 8A, termination bracket 70 is sufficiently long and strong and adapted for assembly with a sufficient number of fasteners to support the entire compressive and tensile loads of the rod without transmission of such rod loads to the monopole tower at intermediate elevations.

Figure 2A:
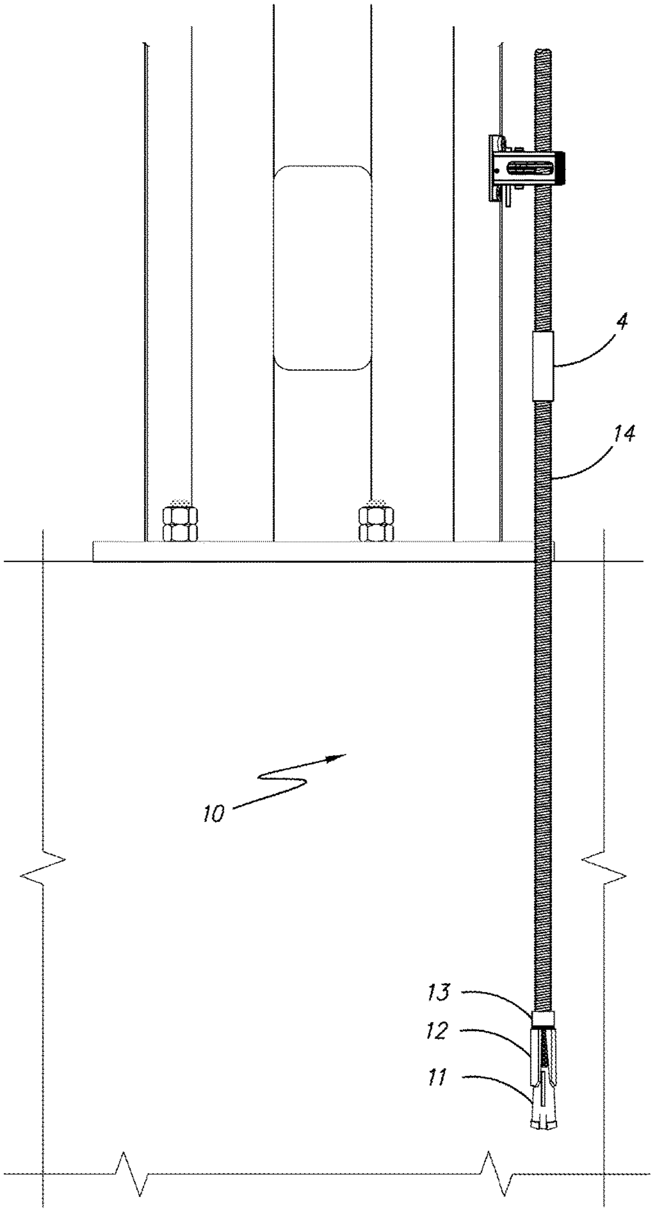
FIG. 2A is an elevation view of a bottom portion of the tower reinforcement system of FIG. 1 cutaway to show an anchor of the present invention.

With reference to FIG. 2A, in a preferred embodiment, anchor 10 may comprise a commercially available wedge anchor for making a mechanical wedge connection to the foundation that does not require grout or adhesive to make the connection. Said anchor may comprise a threaded anchor bar 14 with a thrust ring 13 on a lower portion of the bar and an expansion shell 12 fitted around anchor bar 14 with a clearance fit so that it may freely rotate relative to the bar. The upper end of said shell may be in contact with the downward facing surface of thrust ring 13. The anchor may further comprise a cone 11 connected to bar 14, the upper portion of which is disposed within the bottom portion of said expansion shell 12. Cone 11 may have internal threads for making a threaded connection with the bar threads. The anchor may further comprise an anchor bar nut (not shown) threaded to the anchor bar above the foundation and tightened against the foundation. The anchor bar may be prestressed so as to improve its fatigue life and resistance to cyclic loading.

In operative deployment in a concrete foundation, the anchor is inserted cone-end-first a desired depth into a hole in the foundation. The expansion shell and hole are sized so that they have a snug fit. An anchor bar nut (not shown) may be tightened in contact with the foundation surface, or preferably with a washer or bearing plate disposed between the nut and foundation. The nut may be tightened against a base plate of the tower. Upon turning of the nut, the bar and cone translate toward the nut. The expansion shell is held in place by the walls of the hole. Turning of the nut also tightens the bar to the foundation, thus imparting tension preloading in the bar and compression preloading in the foundation. Tensioning of the bar may cause further insertion of the cone into the expansion shell, thus increasing the radial force between the shell and the foundation. Such preloading may reduce amplitudes of cyclic stress in the bar and foundation from cyclic loading imparted by the reinforcing rod, and thus increase fatigue life of the anchor and the foundation. A tight joint between the bar and foundation can be maintained through cyclic loads by applying a preload that exceeds expected operational tension loads applied on the anchor by the reinforcing member.

The present invention may comprise other commercially available mechanical wedge anchors that may form a connection to the foundation without grout or adhesive. Mechanical wedge anchors may be attached to the ground through other media than the above described concrete foundations, such as attachment directly to rock with suitable holes drilled into the rock. Connection of a reinforcing member to an anchor attached to a monopole foundation is considered herein to be a connection to the ground.

A method of monopole tower reinforcement of the present invention may comprise identifying the desired anchor location; boring an anchoring hole in the desired location to a desired depth and diameter; inserting the anchor into the hole to the desired insertion depth; and tightening the anchor bar. The tightening step may comprise turning the nut until the desired bar tension is achieved. The tightening step may comprise pulling on the upper portion of the bar to put it in the desired tension, such as pulling with a hydraulic tensioner. The tightening step may comprise a combination of pulling the bar in tension and turning the nut. The foregoing method steps may be performed independently with multiple anchors at locations around the monopole.

Figure 2B:
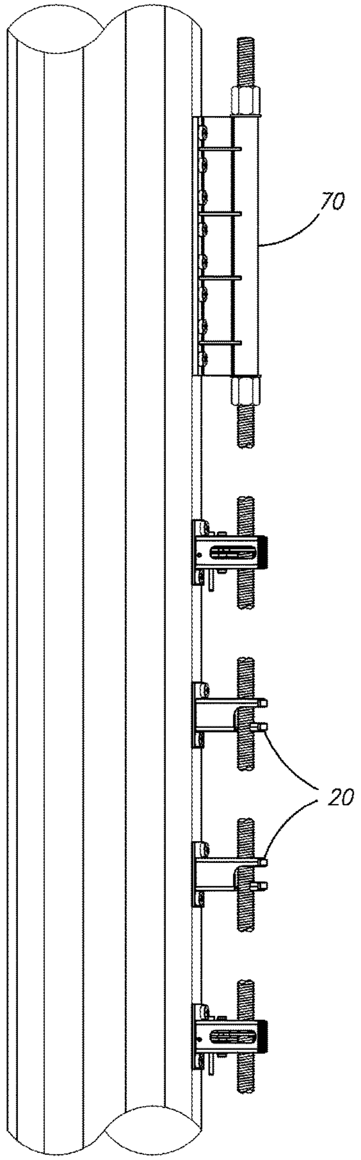
FIG. 2B is an elevation view of an upper portion of the tower reinforcement system of FIG. 1.
Figure 2C:
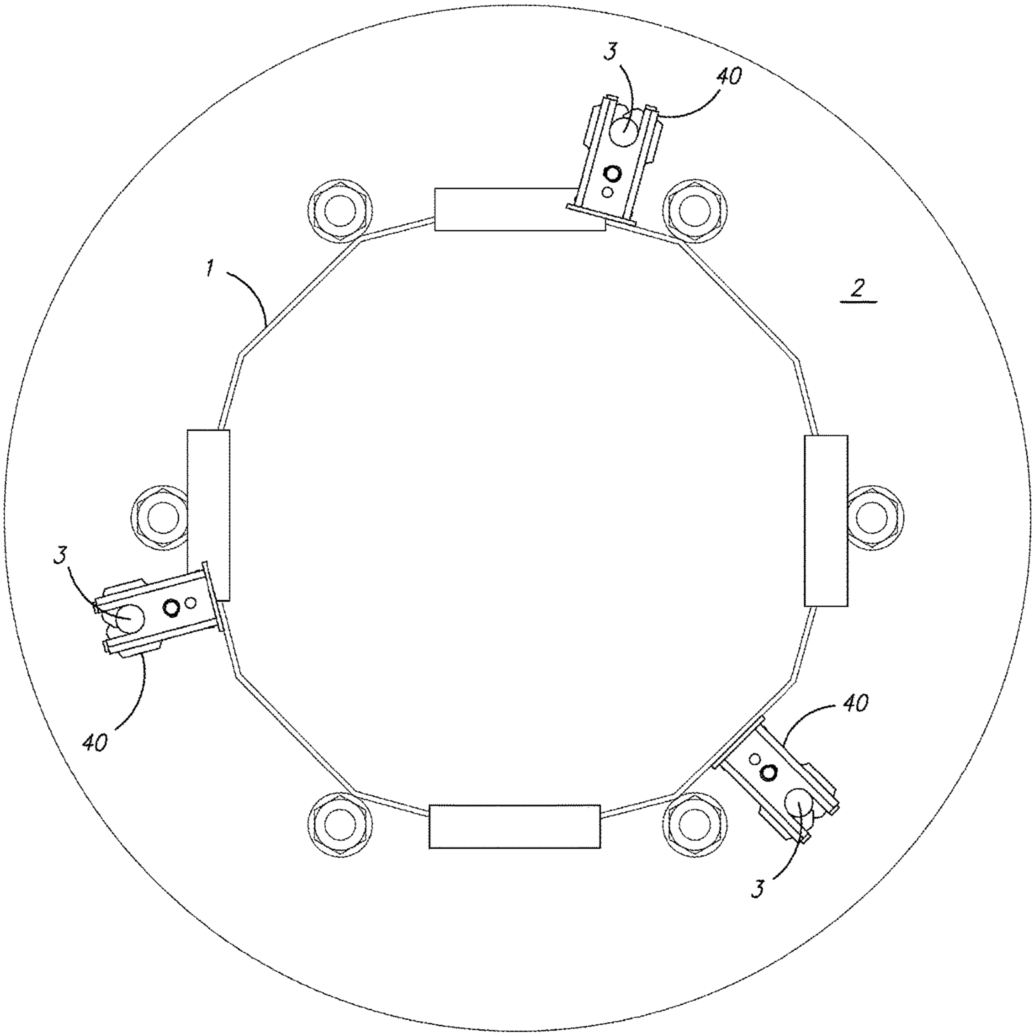
FIG. 2C is a top plan view of a portion of the tower reinforcement system of FIG. 1.
Figure 3A:
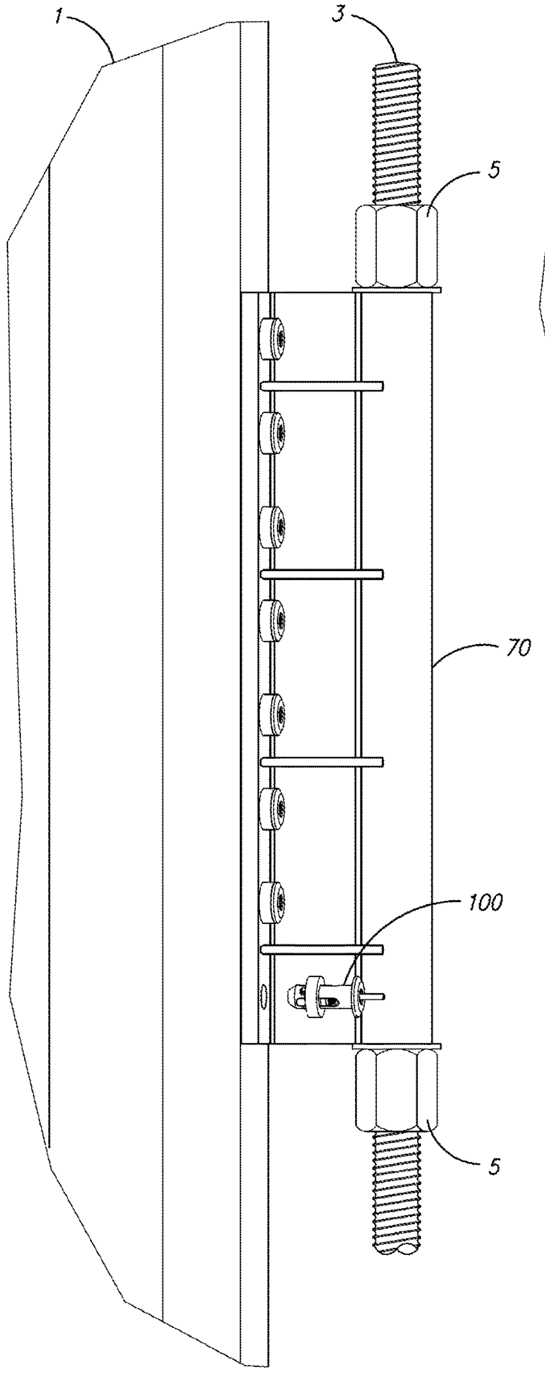
FIG. 3A is an elevation view of an assembly of a tower, support rod and termination bracket of the present invention with one push pin un-inserted.
Figure 3B:
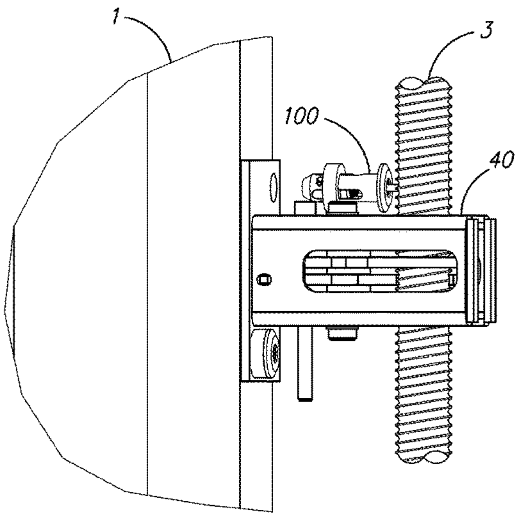
FIG. 3B is a an elevation view of an assembly of a tower, support rod and snap capture standoff of the present invention with one push pin un-inserted.
Figure 3C:
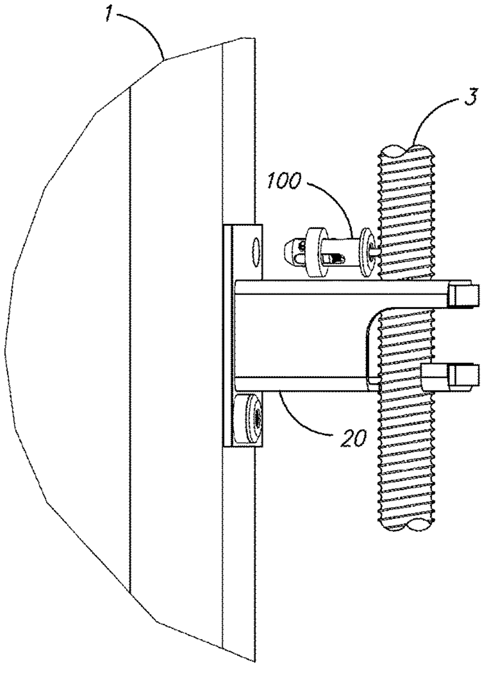
FIG. 3C is an elevation view of an assembly of a tower, support rod and slot-type standoff of the present invention with one push pin un-inserted.
Figure 4A:
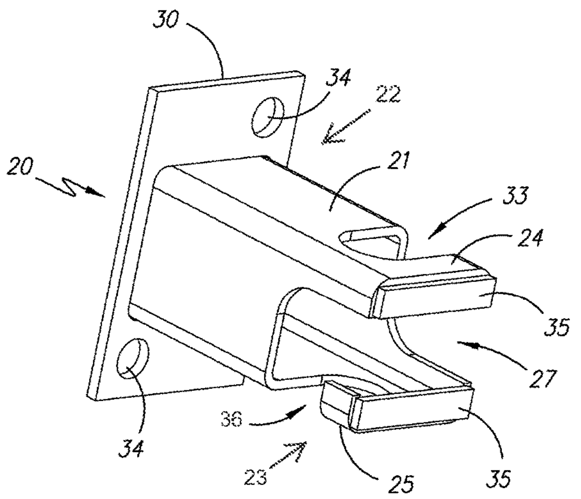
FIG. 4A is a perspective view of a standoff of the present invention.
Figure 4B:
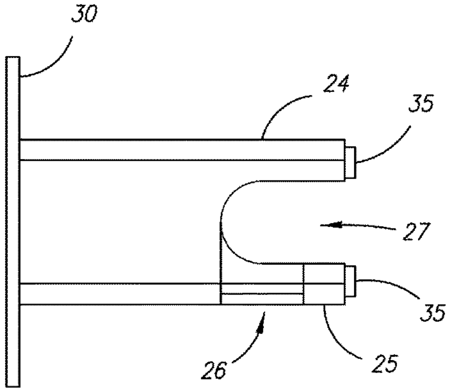
FIG. 4B is a side view of the standoff of FIG. 4A.
Figure 4C:
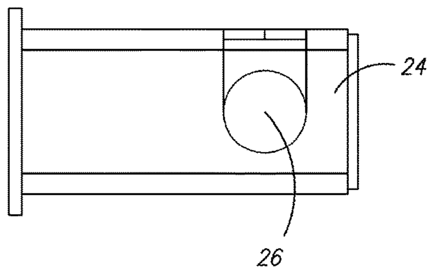
FIG. 4C is a top view of the standoff of FIG. 4A.
Figure 4D:
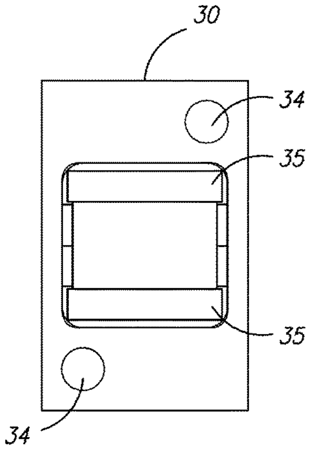
FIG. 4D is an end view of the standoff of FIG. 4A.

With reference to FIGS. 1, 2B and 3C, in the preferred embodiment, reinforcing rod 3 may be stabilized to the monopole with standoffs 20 at one or more intermediate elevations between anchor 10 (see FIG. 1) and termination bracket 70. FIG. 3C shows one push pin 100 before insertion through aligned holes in the monopole and standoff flange.

With reference to FIGS. 4A-4D, in one embodiment standoff 20 comprises a body 21 made from hollow rectangular bar stock, proximal portion 22 adapted for attachment to monopole 1, and distal portion 23 adapted for receiving reinforcing rod 3. The proximal portion comprises flange 30 with holes 34 for receiving fasteners to attach the standoff to the monopole. Said fasteners may be anchor bolts, or any other suitable fastener for structures where access is available from only one side. If access is available to the other side, then the fastener may be any suitable fastener, such as a nut and bolt, for example. In a preferred embodiment, the fasteners are push pins 100 (FIG. 9A).

Standoff 20 and reinforcing rod 3 need not be tightly attached to one another. Thus, the standoff may provide lateral stability to the rod while allowing relative vertical displacement between the rod and standoff Thus loads on the standoff caused by such relative vertical displacement may be avoided or reduced. In the preferred embodiment, standoffs are structurally sufficient to accommodate all loading conditions for a tight fit or loose fit with the rod.

The steps in the installation processes have no order limitation unless expressly recited or implicitly required.

Figure 10A:
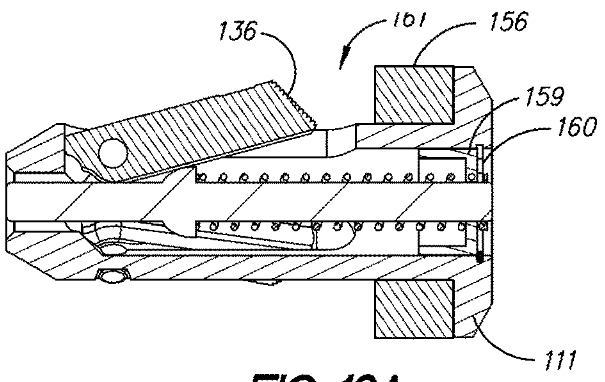
FIG. 10A is a side view of a vertical section down the centerline of the push pin of FIG. 9C.

With reference to FIGS. 9A-11C, one embodiment of push pin 100 comprises a body 110 (FIG. 11A) having a shaft 112 and a head 111, and three retractable blades 130 that are movable between a retracted position (FIG. 10B) and an extended position (FIG. 10A). With reference to FIG. 10C, the push pin may be deployed by inserting it into aligned holes of two objects 300 and 400, whereupon the blades extend outwardly to retain the objects between the blades and head (FIG. 10C).

Figure 11A:
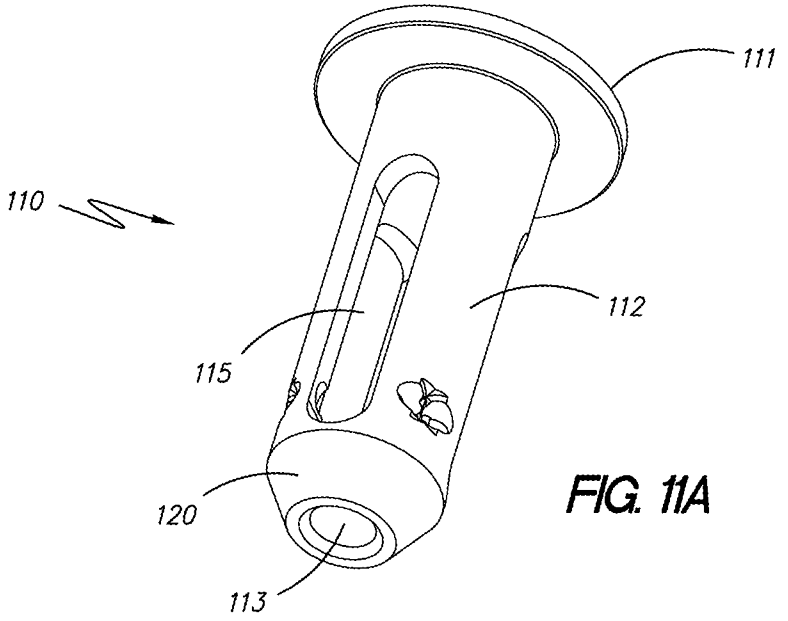
FIG. 11A is a perspective view of a push pin body of the present invention.
Figure 11B:
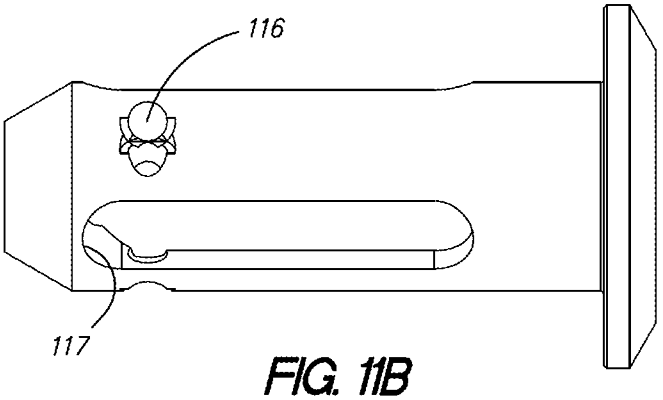
FIG. 11B is a side view of the push pin body of FIG. 11A.
Figure 11C:
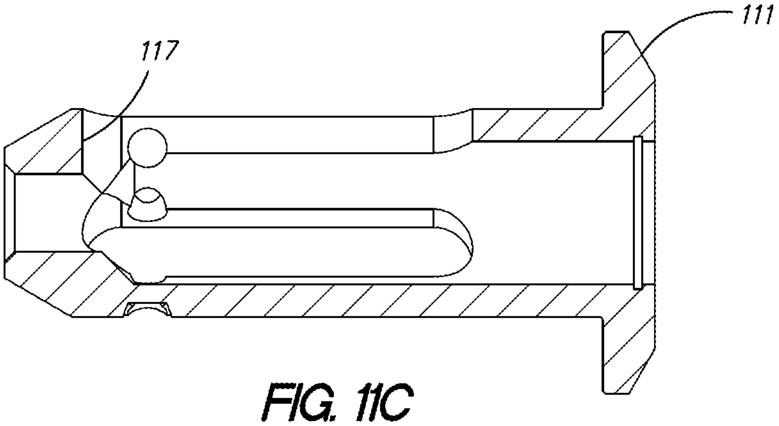
FIG. 11C is a side view of a vertical section down the centerline of the push pin body of FIG. 11A.
Figure 12A:
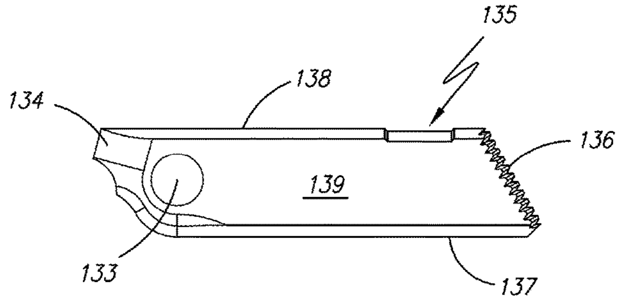
FIG. 12A is a side view of a push pin blade of the present invention.

With reference to FIGS. 11A-11C, push pin body 110 comprises center chamber 113, three sets of pin holes 116 in the distal portion of shaft 112 for each receiving a pivot pin 158 (FIG. 9D), and three openings 115 in the shaft for each receiving a blade 130 (FIGS. 9A and 12A). The distal end of body 110 has chamfered surface 120 to guide entry into a hole. In a preferred embodiment, shaft 112 and chamber 113 are generally cylindrical and may each vary in diameter along their respective longitudinal extent.

Figure 12B:
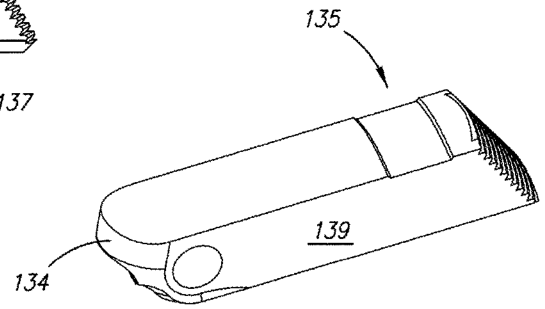
FIG. 12B is a perspective view of the push pin blade of FIG. 12A.
Figure 12C:
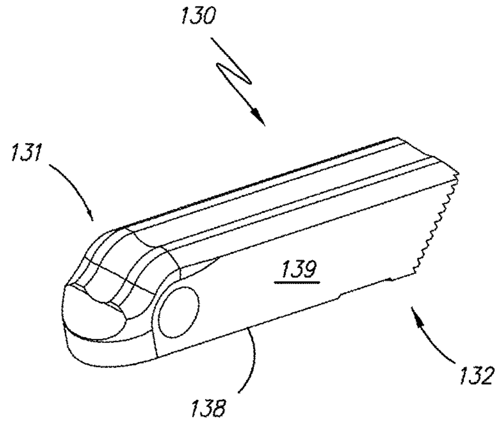
FIG. 12C is another perspective view of the push pin blade of FIG. 12A.

With reference to FIGS. 12A-12C, each blade 130 comprises a pinned end portion 131, free end portion 132, a pin hole 133 in the pinned end portion, and a contact surface 136 at the free end. Contact surface 136 is disposed at an acute angle to the interior side 137 of the blade. Contact surface 136 may have surface features such as knurls, striations, corrugation, ridges, grooves, dimples, or course surface roughness. The pinned end has a stop surface 134 for contacting an opposing stop surface of the pin body when the blade is fully deployed. Exterior side 138 of the blade may have a slight recess 135 for releasably receiving the inside surface of retainer ring 156 (FIG. 10B) for releasably positioning retainer ring in a desired position on the push pin prior to deployment.

With further reference to FIGS. 9A and 11A, blade 130 is disposed through slot 115 of body 110 (FIG. 11A). Pin hole 133 (FIG. 12A) of said blade is aligned with pin holes 116 of the body, and pivot pin 158 is disposed through holes 116 and 133 so as to rotatably attach the blade to the body.

Blade 130 is rotatable between a retracted position (FIG. 10B) and an extended position (FIG. 10A). In the retracted position, the blade is sufficiently retracted within body 110 so as to fit through a hole in an object intended to receive the push pin for operative assembly.

A retainer ring 156 may be slidably disposed around the push pin so as to retain blade 130 in the retracted position prior to operative deployment of the push pin. The retainer ring may secure the push pin in deployment-ready configuration and protect the push pin from damage during shipping and handling.

Figure 10B:
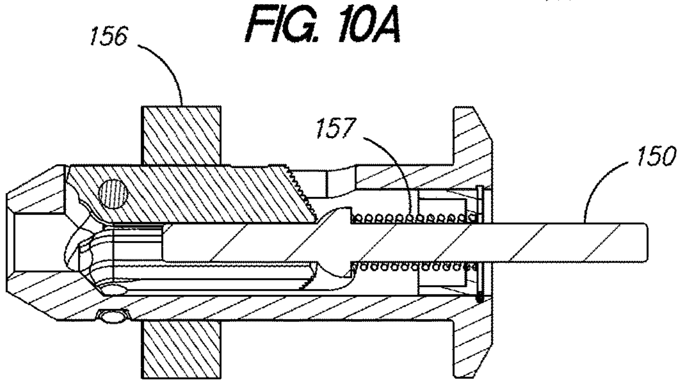
FIG. 10B is the view of FIG. 10A modified to show blades retracted and retainer ring placed around the blades.
Figure 12D:
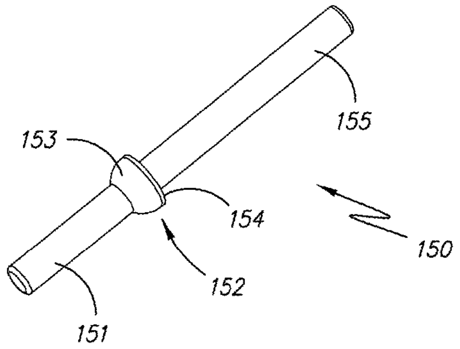
FIG. 12D is a perspective view of a actuator pin of the present invention.

In further reference to FIGS. 10A and 10B, a preferred embodiment of push pin 100 comprises actuator pin 150 disposed in center chamber 113 (FIG. 11A). In reference to FIG. 12D, actuator pin 150 comprises a front shaft portion 151, rear shaft portion 155, and knob 152 between the front and rear shaft portions. Knob portion 152 protrudes outwardly and has a sloped front surface 153 and rear shoulder surface 154. Helical compression spring 157 is disposed around the rear shaft portion 155 of the actuator pin and is compressed longitudinally between shoulder surface 154 of the actuator pin and a spring retention bushing 159 (FIG. 10A). Retention bushing 159 is disposed in center chamber 113 of the push pin, rearward of spring 157. The bushing is captured in place by a snap ring 160 disposed in a circumferential slot in the side wall of center chamber 113.

Spring 157 applies a forward force on actuator pin 150. In the pre-deployment configuration of FIG. 10B, retainer ring 156 keeps blades 130 retracted, knob 152 abuts against the free end of blades 130, and front shaft portion 151 contacts interior sides 137 of blades 130. Upon sliding retainer ring 156 to the position shown in FIG. 10A to release blades 130, spring 157 pushes the actuator pin forward, causing knob 152 to wedge between blades 130 and to pivot them outward to their extended position shown in FIG. 10A. Interior side 137 of the blade may have a longitudinal groove to accommodate shaft portion 155 in the retracted position and guide the knob surface 153 as it moves along the blade. In their fully extended position, stop surface 134 of the blade contacts stop surface 117 (FIG. 11B) of push pin body 110 to prevent further outward pivoting of the blade. In the extended configuration shown in FIG. 10A, there is a space 161 between the retainer ring and contact surface 136 of the blade. In the preferred embodiment shown, space 161 tapers narrower in the radially inward direction.

Figure 10C:
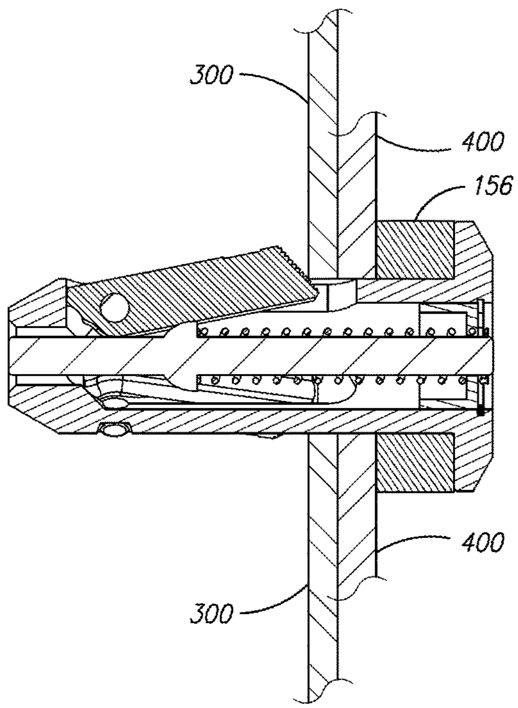
FIG. 10C is the view of FIG. 10A modified to show fastened parts.

The push pin may be used to connect two objects together where the objects are of appropriate thickness and are provided with through holes of appropriate diameter. For such an application, the through holes are aligned and the push pin is pushed through the holes. The blades deploy and the objects are held between contact surface 136 and retainer ring 156 (FIG. 10C). Spring 157 and actuator pin 150 hold blades 130 in their extended position and capture the push pin so as to prevent it from backing out of the holes. Sloped contact surface 136 forming tapered space 161 permits application over a range of object thicknesses. Push pins may be provided in a range of sizes and shapes and may be customized to fit any application. To accommodate different object thicknesses, washers 156 of different thickness may be provided or multiple washers may be used to adjust the size of tapered space 161.

In an embodiment in which a retainer ring is not used, objects may be in direct contact with the head of the push pin and held between the blades and the head.

The preferred embodiment of FIG. 10A comprises an actuator pin, but any means of spring actuation of the blades may be used, such as a spring-actuated ball bearing disposed at the front end of the spring. In the preferred embodiment, the actuator pin is accessible through either end of the center chamber 113 in push pin body 110 so that it may be pushed or pulled against the spring to allow retraction of the blades to set or reset the push pin to the pre-deployment configuration of FIG. 10B.

In a preferred embodiment, the push pin is configured so that blades 130 pivot in plane with the centerline of the push pin, the blades are evenly spaced an angular distance apart from each other around the centerline, and the push pin generally has ⅓ angular symmetry. Although a preferred embodiment of the push pin has three blades, any number of blades any be used. For example, another embodiment may be quarter-symmetrical and comprise four blades. Other embodiments may be asymmetric.

A method of use of the push pin to fasten a plurality of objects having aligned holes may comprise the steps of: providing a push pin; inserting the push pin through the aligned holes; and allowing the blades to extend outwardly. The foregoing inserting step may comprise applying an external driving force against the head end of the push pin in the longitudinal direct. Said external force may comprise a hammer blow. The insertion step may further comprise the step of partially inserting the push pin before applying the driving force.

Optionally, the push pin may be provided with a retainer ring slidably disposed around the push pin so as to hold the blades in the retracted position. In this embodiment, the push pin may be partially inserted in the holes to the point where the retainer ring contacts an object surface. The partial insertion step may be followed by a full insertion step in which the driving force is applied and the push pin is fully inserted to the point where the retainer ring contacts the head of the push pin. The full insertion step causes the retainer ring to slide along the push pin body out of the way of the blades.

In applications involving multiple push pins, the push pins may be inserted independently of one another. Alternatively, the partial insertion step may be performed on two or more push pins before the full insertion step is performed on either or any of said two or more push pins. Thus, objects may be releasably held in alignment by partial insertion of multiple push pins before a full insertion step is performed on a push pin. After the partial insertion step and prior to the full insertion step is performed on a push pin, the push pin may be backed out of the hole. After the full insertion step is performed on a push pin, the push pin is captured in the hole and may only be backed out after applying external force on the actuator pin and moving said actuator pin rearwardly until knob 152 clears the blade path of travel so that the blade may be retracted.

Push pins 100 may be used to attach standoffs 20 and 40 to a monopole tower 1 by aligning standoff holes 58 with holes in the tower and inserting push pins into the aligned holes as described above. The insertion step may be preceded by drilling holes into the monopole for receiving the push pins. Likewise, push pins may be used to attach termination brackets 70 to a monopole.

While the invention has been particularly shown and described with reference to certain embodiments, it will be understood by those skilled in the art that various changes in form and details may be made to the invention without departing from the spirit and scope of the invention as described in the following claims.

We claim:

1. A fastener for inserting into a hole of at least one item, said fastener comprising:

a body comprising a longitudinally extending first body portion for insertion into the hole and a laterally extending second body portion integral to and extending laterally outward from the first body portion for contacting one of the at least one item peripheral to the proximal end of the hole;

said first body portion having at least one laterally facing opening; and at least one retractable member movably connected to the body; wherein said retractable member is movable between a retracted position in which at least a portion of the retractable member is disposed in said opening, and an extended position in which at least a portion of the retractable member extends out of the opening;

said retractable member having a contact surface for contacting one of the at least one item peripheral to the distal end of the hole so as to hold the at least one item between said contact surface and said second body portion;

said retractable member is rotatably connected to the body at a first pivot connection and is rotatable about said pivot connection between said retracted and said extended positions; and at least a portion of said contact surface is sloped away from the second body portion so as to form a tapered space between it and the second body portion.

2. The fastener of claim 1, wherein the at least one retractable member is spring biased toward the extended position.

3. The fastener of claim 2, wherein the spring bias comprises:

an actuating member in movable contact with said retractable member;

said actuating member movable between a first and second position wherein movement of the actuating member to the second position forces the retractable member into the extended position; and a spring in contact with the body and with the actuating member so that the spring biases the actuating member toward the second position.

4. The fastener of claim 3, wherein:

the actuating member is externally accessible so that it may be moved against the spring force to its first position to allow said retractable member to move from the extended position to the retracted position.

5. The fastener of claim 1, further comprising a first of the at least one item wherein said first item comprises a spacer disposed between the second body portion and another of the at least one item.

6. The fastener of claim 5, wherein the spacer is a washer disposed around the first body portion.

7. The fastener of claim 6, wherein the washer is movable between a first position located a longitudinal distance from the second body portion and a second position adjacent to the second body portion; and wherein in the first position the washer is disposed around the retractable member to restrain movement of the retractable member to the extended position; and in the second position the washer is out of the way of movement of the retractable member.

8. The fastener of claim 1, further comprising:

an actuating member in movable contact with said retractable member;

said actuating member movable between a first and second position wherein movement of the actuating member to the second position forces the retractable member into the extended position.

9. The fastener of claim 1, wherein:

the contact surface is disposed between the first pivot connection and the second body portion; and the contact surface is configured to protrude a longitudinal distance into the distal end of the hole when in contact with the at least one item.

10. The fastener of claim 1 wherein the first pivot connection is at a fixed distance from the second body portion.

11. The fastener of claim 1, further comprising a means for forcing the retractable member into the extended position.

12. A fastener for inserting into a hole of at least one item, said fastener comprising:

a body comprising a longitudinally extending first body portion for insertion into the hole and a laterally extending second body portion integral to and extending laterally outward from the first body portion for contacting one of the at least one item peripheral to the proximal end of the hole;

said first body portion having at least one laterally facing opening; and at least one retractable member movably connected to the body; wherein said retractable member is movable between a retracted position in which at least a portion of the retractable member is disposed in said opening, and an extended position in which at least a portion of the retractable member extends out of the opening;

said retractable member having a contact surface for contacting one of the at least one item peripheral to the distal end of the hole so as to hold the at least one item between said contact surface and said second body portion;

wherein the at least one retractable member is spring biased toward the extended position; and the contact surface has surface features comprising knurls, striations, corrugation, ridges, grooves, dimples, or coarse roughness.

13. The fastener of claim 12, wherein:

said retractable member is rotatably connected to the body at a first pivot connection and is rotatable about said pivot connection between said retracted and said extended positions, wherein at least a portion of the contact surface extends out of the opening in the extended position.

14. The fastener of claim 12, further comprising:

an actuating member disposed adjacent to an interior side of the retractable member;

said actuating member being movable between a first and second position wherein said actuating member in the second position prevents the retractable member from retracting.

15. The fastener of claim 12, wherein the spring bias comprises:

an actuating member in movable contact with said retractable member;

said actuating member movable between a first and second position wherein movement of the actuating member to the second position forces the retractable member into the extended position; and a spring in contact with the body and with the actuating member so that the spring biases the actuating member toward the second position.

16. The fastener of claim 12, further comprising:

an actuating member in movable contact with said retractable member;

said actuating member movable between a first and second position wherein movement of the actuating member to the second position forces the retractable member into the extended position.

17. The fastener of claim 16, wherein:

the actuating member is externally accessible so that it may be moved from its second position to its first position to allow said retractable member to move from the extended position to the retracted position.

18. A fastener for fastening to at least one item, said fastener comprising:

a body comprising a longitudinally extending shaft and a laterally extending body portion integral to and extending laterally outward from the shaft;

at least one movable member having a contact surface, said movable member rotatably connected to the body at a first pivot connection a distance from the contact surface;

said pivot connection being at a fixed distance from the laterally extending body portion;

said movable member rotatable about said pivot connection between a first position and second position, wherein the contact surface is disposed further laterally outward from the shaft in the second position than in the first position;

wherein the contact surface is disposed a longitudinal distance from said laterally extending body portion so as to form a space between said contact surface and the said laterally extending body portion for receiving the at least one item; and wherein at least a portion of said contact surface is sloped away from the laterally extending body portion so that at least a portion of said space is a tapered space and further extension of the member tends to maintain tightness between the fastener and at least one item.

19. The fastener of claim 18 wherein movement of the retractable member in the direction from a retracted position toward an extended position reduces a first longitudinal dimension of the tapered space measured at a first distance laterally outward from the shaft.

20. A fastener for inserting into a hole of at least one item, said fastener comprising:

a longitudinally extending first body portion for insertion into the hole and a laterally extending second body portion extending laterally outward from the first body portion for contacting one of the at least one item peripheral to the proximal end of the hole;

said first body portion having at least one laterally facing opening; and at least one retractable member movably connected to the body; wherein said retractable member is movable between a retracted position in which at least a portion of the retractable member is disposed in said opening, and an extended position in which at least a portion of the retractable member extends out of the opening;

said retractable member comprising a contact surface for contacting one of the at least one item peripheral to the distal end of the hole so as to hold the at least one item between said contact surface and said second body portion;

said contact surface being sloped so as to protrude a longitudinal distance into the distal end of the hole when in contact with the at least one item.

21. The fastener of claim 20 further comprising:

an actuating member disposed adjacent to an interior side of the retractable member;

said actuating member being movable between a first and second position;

wherein, upon movement of the actuating member toward the second position, said actuating member pushes outwardly upon and moves the retractable member toward the extended position; and wherein said actuating member in the second position prevents retraction of the retractable member.

22. The fastener of claim 20 wherein:

the at least one retractable member comprises a proximal end, a distal end, and a longitudinal midsection spanning from said proximal end to said distal end;

said proximal end comprising an end surface facing away from the midsection for contacting the at least one item said distal end comprising an end surface facing away from the midsection;

the first body portion comprises a stop surface proximate to and facing the distal end of the retractable member;

said stop surface positioned and configured to contact said distal end surface of a retractable member in an extended position.

23. The fastener of claim 20 wherein:

the second body portion and sloped contact surface form a tapered space between them, the longitudinal dimension of which increases in a laterally outward direction; and movement of the retractable member in the direction from a retracted position toward an extended position reduces a longitudinal dimension of the tapered space.

24. A fastener for inserting into a hole of at least one item, said fastener comprising:

a shaft with at least one laterally facing opening;

at least one retractable blade disposed in said laterally facing opening, said blade being movable to an extended position in which at least a portion of the blade extends laterally outward from the shaft;

a blade retainer statically disposed around the shaft at a first longitudinal position along the shaft so as to hold said blade in a retracted position before insertion of the fastener into the hole;

said retainer being slidably movable to a second longitudinal position along the shaft during fastener insertion into the hole so as to allow extension of the blades; and wherein upon full insertion of the fastener in the hole the blade is in an extended position in which at least a portion of the blade extends laterally outward beyond a periphery of the hole so that at least a portion of the blade contacts the item peripheral to the hole and prevents the fastener from reversing out of the hole.

25. The fastener of claim 24 wherein the retainer is slidably held in static position by friction forces between the blade and the retainer.

26. The fastener of claim 24 wherein the retainer is slidably held in static position by a recess in the blade.

27. The fastener of claim 24 wherein the retainer is a spacer for adjusting fastener compatibility with item thickness.

28. A fastener for inserting into a hole of at least one item, said fastener comprising:

a longitudinal shaft comprising a proximal end, a distal end, and at least one laterally facing opening;

at least one retractable blade disposed in said laterally facing opening, said blade being movable between a retracted position and an extended position;

and said blade comprising a sloped contact surface for contacting the item peripheral to the hole when the blade is in an extended position;

wherein a longitudinal distance between the proximal end of the shaft and the contact surface measured at a distance laterally outward from the shaft decreases as the retractable blade moves in a direction from a retracted position toward an extended position;

wherein the blade is rotatably connected to the fastener at a first pivot connection and is rotatable between said retracted and said extended positions; and a longitudinal distance between the proximal end of the shaft and a point on the contact surface increases as the retractable blade rotates in a direction from a retracted position toward an extended position.

* * * * *